United States Patent
Wetzold

[15] 3,682,993
[45] Aug. 8, 1972

[54] PURIFICATION OF OILS

[72] Inventor: Paul W. Wetzold, Yorktown Heights, N.Y.

[73] Assignee: Paispearl Products, Inc., Hastings-on-Hudson, N.Y.

[22] Filed: Jan. 29, 1970

[21] Appl. No.: 12,524

[52] U.S. Cl. ..............................260/428.5, 260/428
[51] Int. Cl. ................................................C09f 5/10
[58] Field of Search............................260/428, 428.5

[56] References Cited

UNITED STATES PATENTS 2,674,609   4/1954   Beal et al..................260/428
1,885,859   11/1932   Rosenstein et al......260/428.5

FOREIGN PATENTS OR APPLICATIONS 526,294   6/1956   Canada......................260/428

*Primary Examiner*—Lewis Gotts
*Assistant Examiner*—Ethel G. Love
*Attorney*—Arnold G. Gulko

[57] ABSTRACT

Vile smelling oils, and particularly fish oils, are purified by first subjecting the oil to a steam stripping operation under vacuum and in the presence of a small proportion of organic solvent, such as an aliphatic hydrocarbon solvent in an amount of from 2 to about 10 percent, so as to remove volatile amines together with wax and wax ester components. The stripped oil is then purified to remove malodorous components by subjecting the same to adsorption with a quaternary ammonium-acidic clay adduct.

10 Claims, No Drawings

PURIFICATION OF OILS

The present invention relates to the purification of oils and particularly triglyceride oils which are highly unsaturated as evidenced by the fact that the oils contain esters of fatty acids containing at least 18 carbon atoms and having an iodine value of at least about 250 (Wijs method). The invention is particularly directed to the purification of oils in which the fatty acids contained in the oil molecules contain at least 20 carbon atoms and especially to oils which contain arachidonic and/or clupanodonic fatty acids, these being commonly present in fish oils such as cod liver oil, herring, menhaden, pilchard, salmon, sardine and shark liver. Indeed, there are a large number of different fish oils with respect to which the invention has especial relevance, since these oils, as a class, are rich in arachidonic and clupanodonic acids in oil form and since these fish oils are characterized by their strong odor and amine content which render them largely useless for edible purposes where their objectionable odor destroys their commercial value.

In accordance with the present invention, it has been found that satisfactory purification of these vile smelling oils can be achieved utilizing two concepts of purification, each of which are independently meritorious, but which are particularly valuable when used in combination. First, the oil requires a preliminary treatment for the purpose of removing waxes, wax esters and volatile amine components. It has been found that this can be achieved in a particularly desirable manner by steam stripping under vacuum when the oil which is treated contains a small proportion of organic solvent, particularly a hydrocarbon solvent as will be explained more fully hereinafter. Second, it has been found that the oil component derived by steam stripping can be purified to remove the malodorous components thereof by subjecting the same to adsorption with a quaternary ammonium adsorbent, preferably an adduct of a long chain organic quaternary ammonium halide, for example the chloride, with a salt, such as the sodium salt, of an acidic clay, such as montmorillonite.

In the preferred practice of the invention, the oil which has been steam stripped in the presence of hydrocarbon solvent so as to minimize the amine content thereof is subsequently treated by adsorption using a quaternary ammonium-acidic clay adduct having the formula:

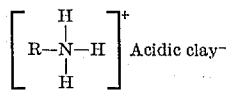

so that highly unsaturated oils are provided which are essentially free of amines and undesirable flavor and odor-imparting substances, the purification being effected in an economical fashion so as to enable the product to be utilized as an edible oil, or as the oil component of oil-modified alkyds, or for other purposes where unsaturated oils are known to be beneficial.

It is stressed that the invention distinguishes between the highly unsaturated oils to be purified and the vile-smelling and similar contaminants largely on the basis of the affinity of the contaminants (which are largely saturated) for the quaternary ammonium adsorbent. The highly unsaturated oils which are treated do not possess such affinity, though the mechanism underlying this selectivity is not presently clear.

As a matter of interest, ordinary adsorbents which are not quaternary ammonium compounds are not satisfactory in the treatment of fish oil, e.g., Fullers Earth is inoperative, as is activated carbon and sulfuric acid activated clay.

It is to be observed that the fish oil which is treated is first subjected to a steam vacuum stripping operation which serves to remove waxy materials as well as to remove volatile amine contaminants. Unless these materials are first removed, the subsequent treatment with the quaternary ammonium-acidic clay adduct is not helpful since the materials removed by the stripping treatment block the quaternary ammonium-acidic clay adduct, thereby preventing reasonable proportions of the adduct from achieving desired purification.

It is stressed that the combination of stripping in the presence of organic solvent as noted hereinbefore and subsequent treatment with quaternary ammonium-acidic clay adducts is particularly beneficial in providing an oil product which is sufficiently free of undesirable odor and flavor imparting substances as to render the same effectively edible. To illustrate, if the organic solvent is omitted from the vacuum steam stripping procedure, then sufficient volatile amines remain behind to foul the final product and these amine components are not removed by the subsequent quaternary ammonium-acidic clay adsorption treatment. It follows that while either of the two purification concepts disclosed herein may be used alone, the combination of both concepts is particularly valuable.

Referring more particularly to the vacuum steam stripping operation, it must be understood that the oils under consideration are highly unsaturated and tend to polymerize as a result of such unsaturation. Accordingly, the time during which these oils can be subjected to elevated temperature is limited as is the temperature to which they can be subjected. On the other hand, at least some elevated temperature is required in order that the volatile amine components might be removed and the waxes coagulated.

As a result of the foregoing, the oils under consideration are heated to a temperature of at least about 40° C. and more preferably to a temperature of at least 50° C. and subjected to vacuum in the presence of steam, the purpose being to coagulate the wax and the wax ester components to enable these to be separated from the oil which is lighter. The elevated temperature and the vacuum which are used are also intended to remove volatile components.

While elevated temperature and vacuum help to remove the volatile components, excessive temperature tends to cause polymerization and hydrolysis of the oil and should be avoided, the maximum temperatures to which the oil may be subjected being determined in part by the time the oil is subjected to the temperature in question. With flash evaporation, one can tolerate temperatures up to about 100° C., but using normal batch operation, lower temperatures would be used, e.g., up to about 80° C. Preferred operating temperatures are in the range of 50°–70° C.

In the invention, the oil has added to it a small proportion of organic solvent. At least 2 percent of solvent is needed, based on the weight of the oil to be treated, but larger proportions may be used up to about 10 percent. The upper limit is determined by economic factors, more solvent being needed when the amine content of the fish oil is higher. Indeed, only fish oils contain amine contaminants, primarily trimethyl amine.

In the absence of added organic solvent, the volatile amine components are not adequately removed by the steam vacuum stripping operation.

While organic solvents as a class have some effectiveness for promoting amine volatility, the aliphatic hydrocarbon solvents are particularly preferred such as mineral spirits, hexane, and the various commercial naphthas. Water-immiscible organic solvents are more desirable for use than water-miscible organic solvents, and reference is made to iso-octyl alcohol and butanol which may be used if desired.

In preferred practice, a relatively high vacuum is used, e.g., 20 mm(Hg.).

Steam is blown through the oil which is preheated to the desired temperature. This operation per se is well known for the purpose of degumming oils and is continued for a time sufficient to coagulate the waxes and wax esters as noted heretofore. The vacuum is maintained on the system after the steam is discontinued until the volatiles which are drawn off no longer contain any observable quantity of organic solvent. This is particularly easy to see when the solvent is water-immiscible.

It is also appropriate to analyze the distillate for amine content, but, normally, when the solvent is no longer present in the distillate, then the distillate is amine free.

The oil, following treatment with steam and vacuum as described, is discharged into a settling tank where it separates into three layers upon cooling. The uppermost layer is generally amber in color and is the liquid oil which is desired.

This upper oil layer is then drawn off and is normally found to include a small proportion of free fatty acid which may be permitted to remain in the oil, or it can be removed by neutralization. Since the neutralization of free fatty acid is quite conventional, it will not be described at length here except to point out that calcium hydroxide would constitute a normal agent for effecting the neutralization and the calcium soap so-formed can be removed by centrifuging the product.

The oil obtained as described above must now be treated utilizing a quaternary ammonium-acidic clay adduct.

Referring first to proportions, it will be readily apparent that the proportion of adsorbing agent which is required will be determined by the contaminant content of the oil to be treated and also by the extent of purification which is desired. In most practical situations, the quaternary ammonium-acidic clay adduct is used in an amount of at least 1 percent, based on the weight of the oil to be treated and more usually in an amount of at least 3 percent. Much larger amounts can be used, the upper limit being determined solely be economic factors. In general, amounts in excess of 10 percent are not needed since this amount is usually more than adequate.

The acidic clays which are utilized in the invention are typically illustrated by montmorillonite clay, such clay normally including a substantial base exchange capacity. Various acidic clays are available in commerce and may be used such as montronite, attapulgite, commercial zeolites and the like, containing a base exchange capacity of at least about 15 milliequivalents of exchangeable ion per 100 grams of clay.

Almost any organic quaternary ammonium halide may be reacted with the acidic clay (usually in the form of a salt such as a magnesium salt) in order to produce the quaternary adducts which are desired in the invention so long as the quaternary compound includes at least 10 carbon atoms so as to adequately compatible with the organic contaminants which it is intended to remove. The resulting adducts have the general formula:

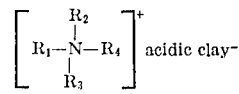

wherein $R_1$ is an alkyl group containing from 10–24 carbon atoms, preferably from 12–18 carbon atoms; $R_2$ is hydrogen, benzyl or an alkyl group containing from one to 24 carbon atoms; and $R_3$ and $R_4$ are each hydrogen or lower alkyl groups containing from one to four carbon atoms. $R_2$, $R_3$, and $R_4$ are preferably either hydrogen or methyl groups.

The above quaternary ammonium adducts can be described as quaternary ammonium-acidic clay adducts in which the quaternary nitrogen atom contains at least one long chain alkyl group containing from 10–24 carbon atoms, preferably from 12–18 carbon atoms. In addition to the monoquaternary ammonium compounds shown in the formula, one can employ diquaternary ammonium compounds in which the two quaternary nitrogen atoms are interconnected through a divalent alkylene group, e.g., the propylene group.

While the entire class of adducts described are useful in the invention, it should be appreciated that some of these agents are more effective than others for the purposes of this invention. It has been found that those adducts which have a greater tendency to swell in or thicken or gel moderately polar liquids such as 2-ethoxy ethanol have a greater capacity to adsorb the relatively saturated contaminants which are present in the fish oils under consideration.

It has also been found that the quaternary ammonium compounds in which the quaternary nitrogen is bonded to at least two hydrogen atoms, and preferably to three hydrogen atoms, are particularly beneficial. These have the formula:

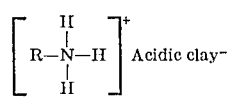

wherein R is an alkyl group containing from 10–24 carbon atoms.

Particularly preferred quaternary ammonium-acidic clay adducts are illustrated by dodecyl ammonium montmorillonite and octadecyl ammonium montmorillonite. Other useful adducts are illustrated by dimethyl dioctadecyl ammonium montmorillonite; benzyl dodecyl dimethyl ammonium montmorillonite; didodecyl ammonium montmorillonite, and related compounds.

The invention is illustrated in the specific example which follows.

EXAMPLE

Step 1

100 pounds of crude herring oil are placed in a jacketed, 20 gallon, glass-lined, vacuum batch still which has provision to blow steam through the material. The crude oil, having added thereto 0.02 percent by weight of butylated hydroxy anisole as a stabilizer and containing about 5 percent of VM & P naphtha having a boiling range of 246°–297° F. is preheated in the still to 60° C. (15 minutes for heating). At this point vacuum and direct steam are employed (line pressure of 3 psig for 17 minutes). After 17 minutes, the distillate is free of solvent and amine. Also, at this time, a coagulation of wax esters, some fatty acids (such as stearic acid and relates) as well as unidentified tissue residue is visible even prior to cooling.

As soon as the steam supply is turned off, the temperature begins to drop, and a relatively high vacuum, 20 mm.(Hg) is utilized. The heat remaining in the batch is inadequate to cause significant polymerization despite the high unsaturation of the oil involved. Cooling water is desirably pumped through the jacket of the still to enhance cooling.

The cooling oil is then discharged into a settling tank and separation takes place as the oil stands and reaches room temperature. Only the upper of the three layers which are formed is of interest to the present development.

Step 2

The upper layer of oil is drawn off and is found to contain a free fatty acid content of 0.6 percent which is neutralized using 5 percent calcium hydroxide which may be employed either dry or in the form of a concentrated aqueous slurry. The oil and the neutralizing agent are simply stirred together in a vessel for approximately 30 minutes to cause the formation of a calcium soap which can be separated with a centrifuge. In this example, the calcium hydroxide treatment reduced the free fatty acid content to 0.06 percent.

Step 3

The partially treated and neutralized oil is then simply mixed, with agitation, in an appropriate vessel with 5 percent by weight, based on the weight of oil being treated, of dodecyl ammonium montmorillonite. After approximately 30 minutes of mixing, the system is allowed to settle for at least six hours previous to separation of the ammonium montmorillonite from the oil by centrifugation.

As a result of this procedure, all of the unwanted phospholipids and related compounds are removed and the color of the oil is now changed to a very light yellow with no noticeable fish odor.

In actual operation, the 100 pounds of crude herring oil referred to hereinbefore yielded 83 pounds of refined oil.

Repeating the foregoing, but utilizing octadecyl ammonium montmorillonite in the same proportion produced substantially the same result.

The invention is defined in the claims which follow.

I claim:

1. In a process for the purification of unsaturated oils, said oils containing esters of fatty acids containing at least 18 carbon atoms and having an iodine value of at least about 250, the improvement comprising subjecting said oil from which wax, wax esters and volatile amines have been removed to adsorption utilizing a quaternary ammonium-acidic clay adduct in an amount of at least 1 percent, based on the weight of the oil to be treated, said acidic clay having a base exchange capacity of at least about 15 milliequivalents of exchangeable ion per 100 grams of clay and the quaternary nitrogen atom of said adduct contains at least one long chain alkyl group containing from 10–24 carbon atoms.

2. A process as recited in claim 1 in which said adduct has the formula:

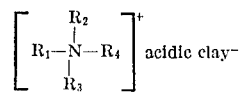

wherein $R_1$ is an alkyl group containing from 10–24 carbon atoms, preferably from 12–18 carbon atoms; $R_2$ is hydrogen, benzyl or an alkyl group containing from one to 24 carbon atoms; and $R_3$ and $R_4$ are each hydrogen or lower alkyl groups containing from one to four carbon atoms.

3. A process as recited in claim 2 in which $R_2$, $R_3$ and $R_4$ are either hydrogen or methyl.

4. A process as recited in claim 1 in which said adduct has a strong tendency to thicken or gel 2-ethoxy ethanol and is used in an amount of from 3 to about 10 percent, based on the weight of the oil to be treated.

5. A process as recited in claim 4 in which said oil is fish oil.

6. A process for the purification of fish oil comprising subjecting said oil at a temperature in the range of from 50°–70°C. to steam stripping under vacuum in the presence of at least 2 percent by weight of an aliphatic hydrocarbon solvent, maintaining the vacuum to remove said solvent and, with it, the volatile amine content of said fish oil, settling the stripped oil and removing the uppermost layer of stripped oil so-obtained, and removing malodorous components from said stripped oil by adsorption with at least 1 percent, based on the weight of the oil to be treated, of a quaternary ammonium-acidic clay adduct adapted to thicken or gel 2-ethoxy ethanol, said acidic clay having a base exchange capacity of at least about 15 milliequivalents of exchangeable ion per 100 grams of clay and the quaternary nitrogen atom of said adduct contains at least one long chain alkyl group containing from 10–24 carbon atoms.

7. A process as recited in claim 6 in which said organic solvent is an aliphatic hydrocarbon solvent and said adduct has the formula:

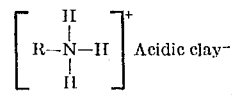

wherein R is an alkyl group containing from 10–24 carbon atoms.

8. A process as recited in claim 1 in which said wax, wax esters and volatile amines are removed by subjecting said oil, at a temperature of at least about 40°C. up to about 100°C., to a steam stripping operation under vacuum while said oil contains at least 2 percent by weight of an aliphatic hydrocarbon solvent.

9. A process as recited in claim 8 in which said aliphatic hydrocarbon solvent is a commercial naphtha and a relatively high vacuum is used, said vacuum being maintained after steam stripping is discontinued until the volatiles which are drawn off are substantially free of solvent.

10. A process as recited in claim 1 in which said acidic clay is montmorillonite clay.

* * * * *